PROCESS FOR PREPARING A LITHOGRAPHIC PRINTING PLATE CONTAINING AN OLEOPHILIC DIMER IMAGE OF AN OXIDIZED SILVER HALIDE DEVELOPING AGENT

Filed Feb. 24, 1971 2 Sheets-Sheet 1

INVENTORS
TOSHIICHI YOSHIDA
TAKASCHI NAKAMURA
KINJI OHKUBO

BY Sughrue, Rothwell, Mion, Zinn & Macpeak

ATTORNEYS

INVENTORS
TOSIICHI YOSHIDA
TAKASCHI NAKAMURA
KINJI OHKUBO

BY Sughrue, Rothwell, Mion, Zinn & Macpeak
ATTORNEYS 3,723,119

PROCESS FOR PREPARING A LITHOGRAPHIC PRINTING PLATE CONTAINING AN OLEOPHILIC DIMER IMAGE OF AN OXIDIZED SILVER HALIDE DEVELOPING AGENT

Toshiichi Yoshida, Takashi Nakamura, and Kinji Ohkubo, Kanagawa, Japan, assignors to Fuji Photo Film Co., Ltd., Kanagawa, Japan Continuation-in-part of abandoned application Ser. No. 660,366, Aug. 14, 1967. This application Feb. 24, 1971, Ser. No. 118,493
Claims priority, application Japan, Aug. 12, 1966, 41/52,937
Int. Cl. G03f 7/02
U.S. Cl. 96—33 13 Claims

ABSTRACT OF THE DISCLOSURE

A lithographic printing plate and a method for its preparation comprising image wise exposing a silver halide emulsion layer whose surface is hydrophilic and developing said layer with a developing agent which forms an oleophilic dimer from its oxidation product to produce on the layer an oleophilic dimer image receptive to greasy ink wherein the developing agent is incorporated in either or both the layer and processing solution.

CROSS-REFERENCES TO RELATED APPLICATIONS

This is a continuation-in-part application based upon U.S. application Ser. No. 660,366, filed Aug. 14, 1967, now abandoned, claiming priority based on Japanese application No. 41/52,937, filed Aug. 12, 1966.

BACKGROUND OF THE INVENTION

Field of the invention

This invention relates to a process for preparing a lithographic printing plate using a photographic silver halide emulsion.

Description of the prior art

Up to date, a number of methods have been proposed for preparing a lithographic printing plate. For example, one method consists in exposing to radiation and thereby differentially hardening a light-sensitive organic colloid layer coated on a support and then removing the nonexposed and nonhardened areas to leave the oleophilic areas on the surface of the plate. Another process consists in exposing to radiation and thereby differentially hardening a light-sensitive organic colloid layer coated on a support and then transferring the nonexposed and nonhardened areas to another receiving sheet to leave an oleophilic pattern on the surface of the receiving sheet. Another process consists in exposing to radiation a light-sensitive gelatino-silver halide layer coated on a support and then subjecting it to tanning development whereby to tan the gelatin in the exposed areas and to provide the oleophilic pattern on the said layer. A still further process consists in exposing to radiation a silver halide emulsion layer whose surface is hydrophilic and then developing said exposed layer with a nontanning developing agent whose oxidation product is capable of forming an oleophilic image by reaction with an oleophilic image forming agent to produce an oleophilic image on said hydrophilic layer, as disclosed in copending application Ser. No. 652,303, filed July 10, 1967, now U.S. Pat. No. 3,615,444.

In any case, the lithographic printing plate is obtained by forming an oleophilic pattern on a hydrophilic plate surface.

SUMMARY OF THE INVENTION

An object of the invention is to provide a novel process for preparing a novel lithographic printing plate.

A further object of the invention is to provide a process for preparing a lithographic printing plate having a high sensitivity.

Another object of the invention is to provide a method of obtaining a lithographic printing plate by treatment in several baths after exposure.

Still other objects of the invention will appear hereinafter.

BRIEF DESCRIPTION OF THE INVENTION

This invention consists of a process for preparing a lithographic printing plate, which comprises exposing to a subject a photographic element comprising a support having thereon a silver halide emulsion layer whose surface is hydrophilic, developing said exposed emulsion layer with a developing agent which is capable of forming an oleophilic dimer from its oxidation product to produce on said hydrophilic emulsion layer an oleophilic dimer image receptive of greasy printing ink, wherein said developing agent is incorporated in at least one of the layers of said photographic element and processing solution.

As an essential feature of the present invention, the pH during development must be at least 12.5 in order that the oleophilic dimer may form. When the pH is less than 12.5 during development, it has been found that certain developing agents will not form the corresponding oleophilic dimer.

For instance, in U.S. reissue Pat. 25,885 to Yackel et al., it is disclosed at column 3, lines 40–52, that some silver halide developing agents, such as catechol, hydroquinone and toluhydroquinone, which are known to be strong gelatin-tanning silver halide developing agents, are not useful in the sensitive elements, presumably because the oxidation products formed in the presence of the hydrophilic organic colloid silver halide emulsion layer fail to form oleophilic images. This phenomenon is due to the fact that Yackel et al. fail to carry out development at a pH alkaline enough to permit these nonoleophilic dimer-forming compounds to dimerize. However, the inventors of the present invention have surprisingly discovered that when the pH during development is at least 12.5, aromatic silver halide developing agents are capable of forming the corresponding oleophilic dimer.

The silver halide emulsion layer whose surface is hydrophilic is prepared by applying to a support of paper, film or metal plate, a suspension of fine crystal silver chloride, silver bromide, silver chlorobromide, silver iodobromide or silver chlorobromide containing a small amount of silver iodide in a binder such as gelatin, polyvinyl alcohol, polyvinylpyrrolidone, other natural or synthetic polymer or their mixture.

Suitable for use as the developing agent which is capable of forming an oleophilic dimer from its oxidation product in the process of our invention, are thioindoxyl (I), 6-methoxythioindoxyl (II), 6-ethyoxythioindoxyl (III), indoxyl (IV), 4-hydroxyisocarbostyril (V), 4-methoxy-1-naphthol (VI), 4-ethoxy-1-naphthol (VII), pyrogallol-1,3-dimethylether (VII), o-aminophenol (IX), 2-amino-3,5-dimethylphenol (X), 1-phenyl-3-methyl-4-amino-5-pyrazolone (XI), 1,5-dihydroxynaphthalene (XII), p-phenylenediamine derivatives (XIII–XVII) and hydroquinone (XVIII). Although all of these compounds dissolve in an aqueous alkali and exhibit developing properties to exposed or fogged silver halide emulsion, their oxidation products after development form water-insoluble, oleophilic dimers as shown below:

(I)

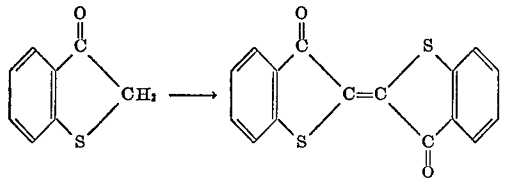

(II)

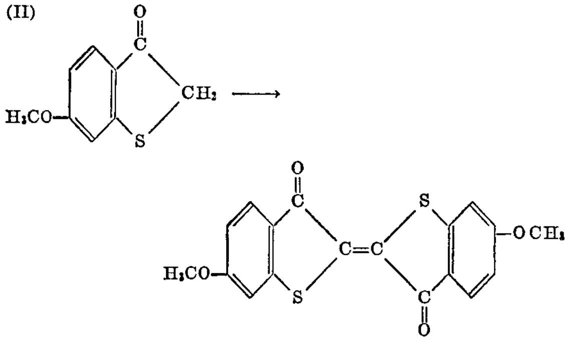

(III)

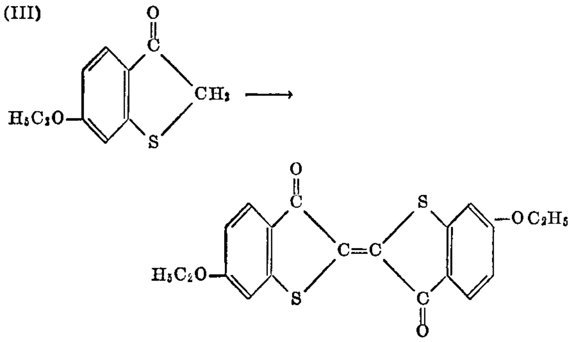

(IV)

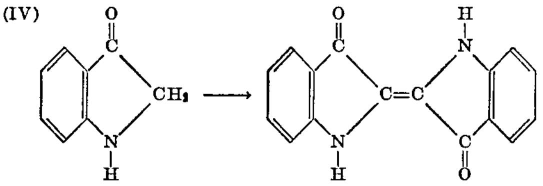

(V)

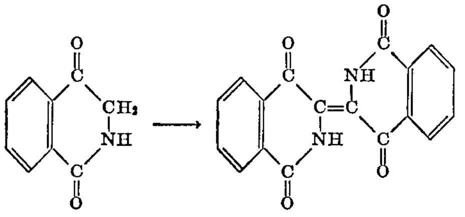

(VI)

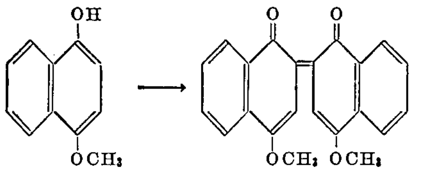

(VII)

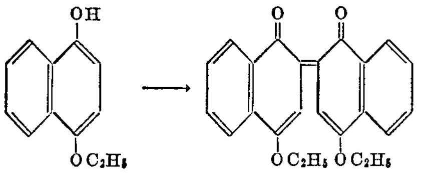

(VIII)

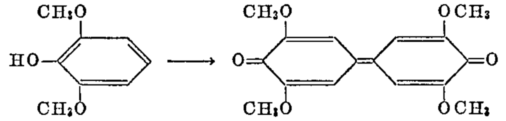

(IX)

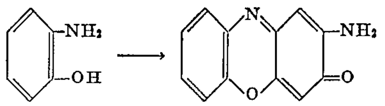

(X)

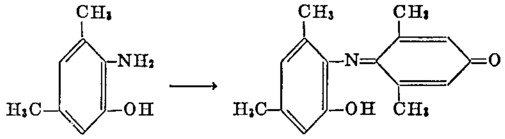

(XI)

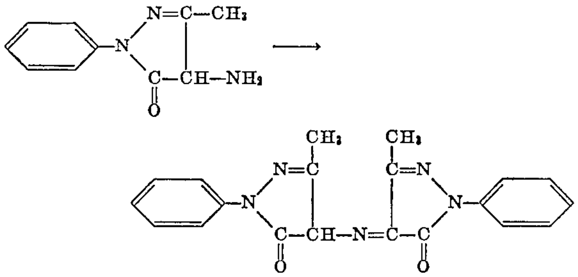

(XII)

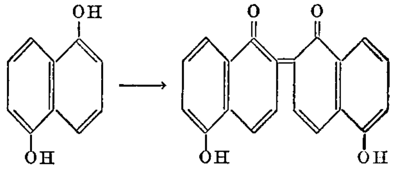

(XIII-XVII)

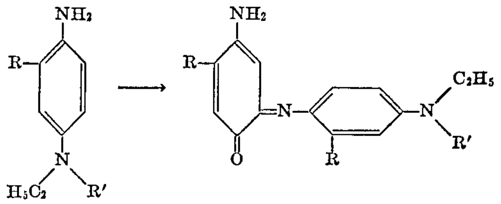

| | | |
|---|---|---|
| (XIII) | R=—H | R'=—$C_2H_5$ |
| (XIV) | R=—$CH_3$ | R'=—$C_2H_5$ |
| (XV) | R=—H | R'=—$CH_2CH_2OH$ |
| (XVI) | R=—$CH_3$ | R'=—$CH_2CH_2NHSO_2CH_3$ |
| (XVII) | R=—$CH_3$ | R'=—$CH_2CH_2OH$ |

(XVIII)

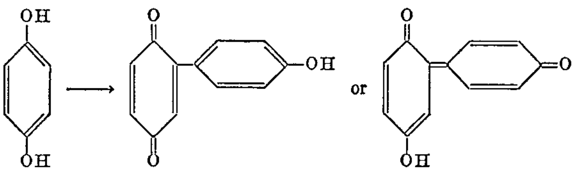

It is well known that the oxidation products of the compounds of from (I) to (XII) form dimers as disclosed by C. E. K. Mees and T. H. James in "Theory of the Photographic Process," 1966, pp. 302–303 (The MacMillan Co.), for instance.

The present invention is based upon the discovery that when such dimer is formed in a hydrophilic silver halide emulsion layer containing no additive on a hydrophilic silver halide emulsion layer containing a developing agent, the surface thereof becomes oleophilic and ink-receptive. In a sense, our invention consists in the commercial application of this experimental fact to the preparation of a lithographic printing plate.

DESCRIPTION OF THE DRAWINGS

Various embodiments are possible to carry out the process of our invention, some of which will become apparent from the following description and drawings, in which.

Figure 1:
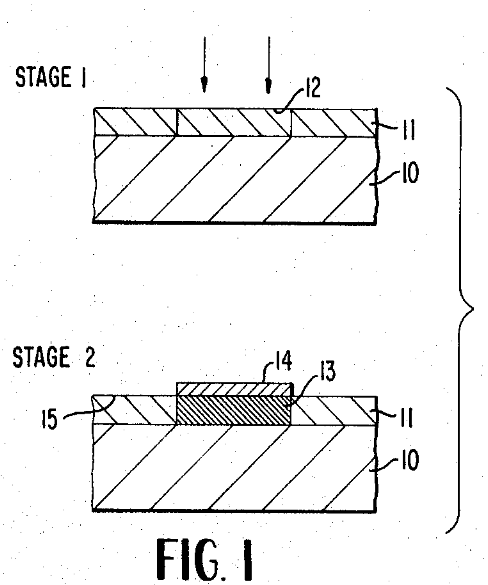
FIGS. 1–7 are schematic representations of seven embodiments of our invention, FIGS. 1–3 showing negative-positive processes and FIGS. 4–7 positive-positive processes.

In the stage 1 of FIG. 1, layer 10 of the element representing paper, film and/or metal foil, etc., is coated with silver halide emulsion layer 11 and an area 12 of the element is exposed to light. After the exposure, the element is developed in an alkaline bath containing a developing agent capable of forming an oleophilic dimer from its oxidation product, immersed in a stopping bath and then inked, thereby obtaining an inked image as shown in stage 2 of FIG. 1. An area 13 is an oleophilic image consisting of the dimer of the oxidation product of the developing agent and inked image 14 is formed thereupon, while nonexposed area 15 is left hydrophilic and ink-repellent when moistened with water.

Figure 2:
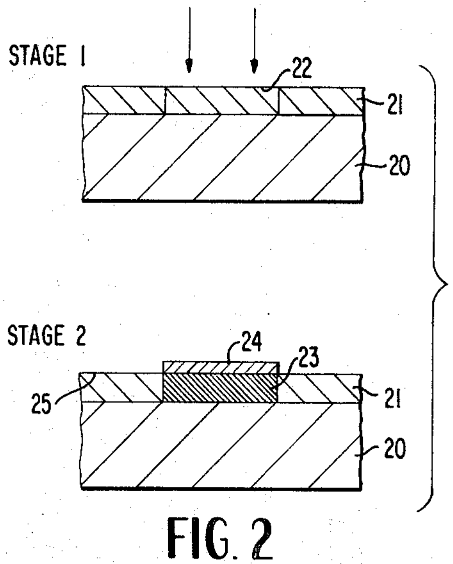

In the stage 1 of FIG. 2, layer 20 of the element representing a support such as paper, film and metal foil is coated with silver halide emulsion layer 21 containing a developing agent capable of forming an oleophilic dimer from its oxidation product and an area 22 of the element is exposed to light.

After the exposure, the element is developed in an alkaline bath, immersed in a stopping bath and then inked, thereby obtaining an inked image as shown in the stage 2 of FIG. 2. An area 23 is an oleophilic image consisting of the dimer of the oxidation product of the developing agent and inked image 24 is formed thereupon, while nonexposed area 25 is left hydrophilic and ink-repellent when moistened with water.

Figure 3:
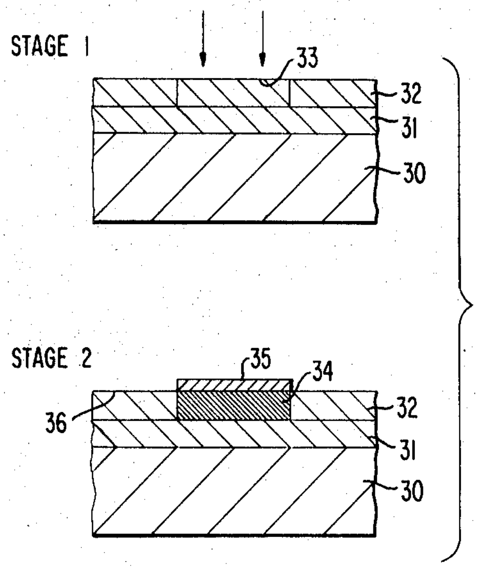

In the stage 1 of FIG. 3, layer 30 of the element representing a support such as paper, film and metal foil is coated with layer 31 containing a developing agent capable of forming an oleophilic dimer from its oxidation product and with silver halide emulsion layer 32 in order and an area 33 of the element is exposed to light.

After the exposure, the element is developed in an alkaline bath, immersed in a stopping bath and then inked, thereby obtaining an inked image as shown in the stage 2 of FIG. 3. An area 34 is an oleophilic image consisting of the dimer of the oxidation product of the developing agent and inked image 35 is formed thereupon, while nonexposed area 36 is left hydrophilic and ink-repellent when moistened with water.

Figure 4:
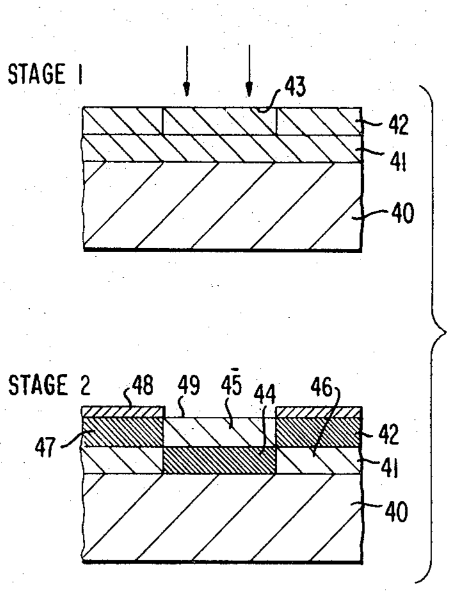

In the stage 1 of FIG. 4, layer 40 of the element representing a support such as paper, film and metal foil is coated with silver halide emulsion layer containing a developing agent capable of forming an oleophilic dimer from its oxidation product and with fogged silver halide emulsion layer 42 in order, and an area 43 of the element is exposed to light.

After the exposure, the element is developed in an alkaline bath, immersed in a stopping bath and then inked, thereby obtaining an inked image as shown in the stage 2 of FIG. 4. In area 44 of layer 41, the development is carried out and the developing agent is consumed. Consequently, there occurs no change in exposed area 45 of layer 42. On the other hand, since the development is not carried out in nonexposed area 46 of layer 41, the developing agent not consumed there diffuses and reaches nonexposed area 47 of layer 42, where the development is carried out. Thus, an oleophilic image consisting of the dimer of the oxidation product of the developing agent is formed in area 47 and an inked image 48 is formed, while exposed area 49 is left hydrophilic and ink-repellent when moistened with water.

Figure 5:
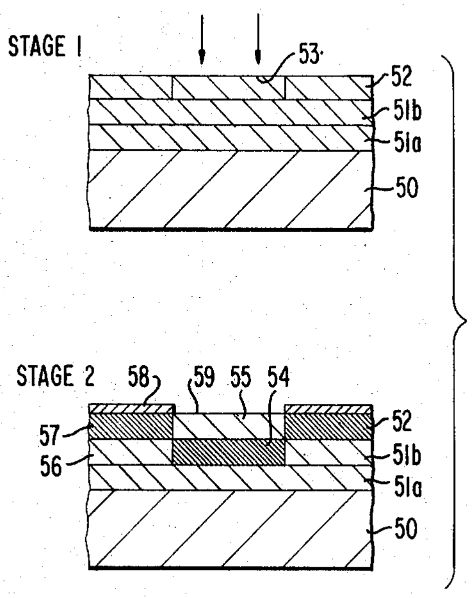

In the stage 1 of FIG. 5, layer 50 of the element representing a support such as paper, film and metal foil is coated with layer **51*a* containing a developing agent capable of forming an oleophilic dimer from its oxidation product, silver halide emulsion layer 51*b* and fogged silver halide emulsion layer 52 in order and an area 53** of the element is exposed to light.

After the exposure, the element is developed in an alkaline bath, immersed in a stopping bath and then inked, thereby obtaining an inked image as shown in the stage 2 of FIG. 5. In exposed area 54 of layer **51*b*, the development is carried out by the developing agent diffused from layer 51*a* and it is consumed. Consequently, there occurs no change in exposed area 55 of layer 52. On the other hand, the development is not carried out in unexposed area 56 of layer 51*b*, so the developing agent not consumed there diffuses further and reaches nonexposed area 57 of layer 52, where the development is carried out. There is thus formed an oleophilic image consisting of the dimer of the oxidation product of the developing agent in area 57 and inked image 58 thereupon, while exposed area 59** is left hydrophilic and ink-repellent when moistened with water.

Figure 6:
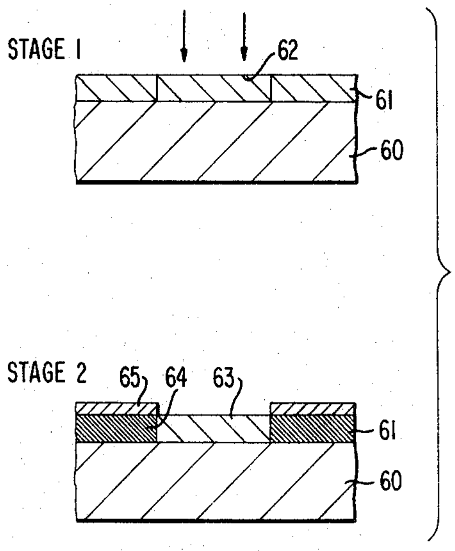

FIG. 6 illustrates a positive-positive process using four baths.

In the stage 1 of FIG. 6, layer 60 of the element representing a support such as paper, film and metal foil is coated with silver halide emulsion layer 61 and an area 62 of the element is exposed to light.

After the exposure, the element is developed in a first nontanning developing agent, washed with water, developed in an alkaline developing solution containing a fogging agent of silver halide and second developing agent capable of forming an oleophilic dimer from its oxidation product, then immersed in stopping bath and inked. An inked image is obtained as shown in the stage 2 of FIG. 6. Developing is carried out in exposed area 63 of layer 61. No oleophilic image being formed, however, area 62 is left hydrophilic and ink-repellent when moistened with water.

In nonexposed area 64 of layer 61, on the other hand, the development is carried out in the second development to form an oleophilic image consisting of the dimer of the oxidation product of the second developing agent and inked image 65 is formed.

In the foregoing method, the steps of water washing and stopping may be omitted if the conditions warrant.

Figure 7:
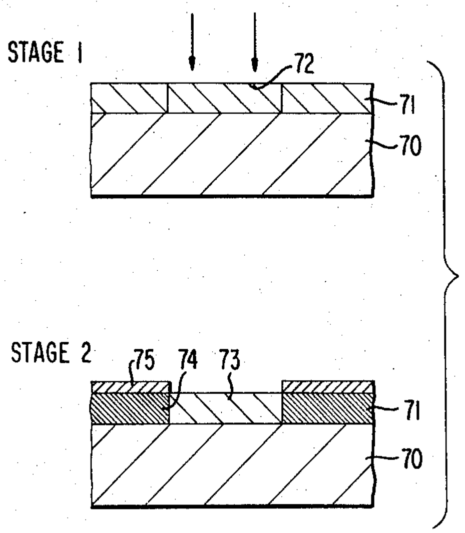

FIG. 7 illustrates a positive-positive process utilizing four baths.

In the stage 1 of FIG. 7, layer 70 of the element representing a support such as paper, film and metal foil is coated with silver halide emulsion layer 71 containing a first nontanning developing agent and an area 72 of the element is exposed to light.

After the exposure, the element is developed in an alkaline bath, washed with water, developed in an alkaline solution containing a fogging agent of silver halide and second developing agent capable of forming an oleophilic dimer from its oxidation product, immersed in a stopping bath and then inked, thereby obtaining an inked image as shown in the stage 2 of FIG. 7. Development is carried out in exposed area 73 of layer 71. No oleophilic image being formed, however, part 72 is left hydrophilic and ink-repellent when moistened with water. In nonexposed part 74 of layer 71, on the other hand, the development is carried out in the second development to form an oleophilic image consisting of the dimer of the oxidation product of the second developing agent and inked image 75 is formed.

In this method, also, the steps of water washing and stopping may be omitted if the conditions warrant.

Advantages of the process for preparing a lithographic printing plate according to our invention are the following. Firstly, the sensitivity of the lithographic printing plate can be raised to such an extent as those found in the conventional printing paper for enlarging and negative film for photography by the known sensitizing method of silver halide emulsion, since it depends upon the sensitivity of silver halide emulsions. Secondly, lithographic printing plates can be obtained by subjecting the element to several bath processing of developing and stopping and other treatments after exposure, resulting in the saving of the cost of processing apparatus and of the operation. Thirdly, both the negative-positive process plates and positive-positive process plates can be obtained by the method of our invention.

The invention will be further explained by the following examples, although the invention shall not be restricted to them only.

EXAMPLE 1

(Cf. FIG. 1, negative-positive process)

Two ml. of 6% formaldehyde aqueous solution was added to 100 g. of a photographic emulsion containing 9.3 g. of gelatin and 11.0 g. of pure silver bromide applied to a film to yield a coating having 37.5 ml. of the resulting emulsion per m.$^2$ and dried to give a printing plate element.

After exposure, the element was developed at 30° C. for one minute in a developing solution having the following composition:

| | |
|---|---|
| 16% 1,5-dihydroxynaphthalene methanol solution ----ml-- | 100 |
| Anhydrous sodium sulfite ----g-- | 0.13 |
| Caustic soda ----g-- | 3.4 |
| Water to 1,000 ml. | |

After the development, it was immersed in a stopping solution having the following composition for 90 seconds to obtain a lithographic printing plate:

| | Ml. |
|---|---|
| Orthophosphoric acid ---- | 4.7 |
| Benzyl alcohol ---- | 5.4 |
| Water to 1,000 ml. | |

Development in this example was carried out at a pH of 12.90.

EXAMPLE 2

(Cf. FIG. 2, negative-positive process)

Two grams of 4-amino-N,N-diethylaniline, 0.5 ml. of 1% sodium 13 - (p-nonylphenoxy) - 5,8,11 - trioxatridecane - 1 - sulfonate aqueous solution, 0.2 ml. of 6% saponin aqueous solution, 5.8 ml. of 2% mucochloric acid aqueous solution and 1.0 ml. of 5% anhydrous sodium carbonate aqueous solution were added to 100 g. of a photographic emulsion containing 13.6 g. of gelatin and 3.4 g. of silver chlorobromide (silver bromide 30 mole percent) applied to a waterproof paper to yield a coating having 180 ml. of the resulting emulsion per m.$^2$ and dried to prepare a printing plate element.

After exposure, the element was developed in an activating solution of the following composition at 30° C. for 20 minutes:

| | |
|---|---|
| Caustic soda ----g-- | 3.4 |
| Water to 1,000 ml. | |

After the development, it was immersed in the stopping solution of Example 1 for 20 seconds to obtain a lithographic printing plate.

Development in this example was carried out at a pH of 12.98.

EXAMPLE 3

(Cf. FIG. 3, negative-positive process)

To a film base was applied a solution containing 100 ml. of 15% gelatin aqueous solution, 2 ml. of 1 N sulfuric acid, 10 ml. of 6% saponin aqueous solution, 1 g. of pyrogallol - 1,3 - dimethyl ether, and 8 ml. of 6% formaldehyde aqueous solution to yield a coating having 180 ml. of the resulting solution per m.$^2$. Ten ml. of 6% saponin aqueous solution and 5 ml. of 6% formaldehyde aqueous solution were added to 100 g. of a photographic emulsion containing 15.0 g. of gelatin and 4.0 g. of green-sensitized silver chloride, applied to the resulting coating to yield a coating having to 24 ml. of the resulting emulsion per m.$^2$ and dried to prepare a printing element.

After exposure, the element was developed in an activating solution of the following composition at 30° C. for seven minutes:

| | |
|---|---|
| Caustic soda ----g-- | 40 |
| Water to 1,000 ml. | |

After the development, it was immersed in the stopping solution of Example 1 for 20 seconds to obtain a lithographic printing plate.

The process of this example becomes a positive-positive process when using a low sensitive, partially fogged direct positive silver chloride emulsion (cf. U.S. Pat. 2,541,472, for instance) in place of the green-sensitive silver chloride emulsion of the example and exposing through a yellow filter.

Development in this example was carried out at a pH of 13.58.

EXAMPLE 4

(Cf. FIG. 4, positive-positive process)

Two and a half grams of 4-amino-3-methyl-N,N-diethylaniline and 8 ml. of 6% formaldehyde aqueous solution were added to 100 g. of a photographic emulsion containing 15.0 g. of gelatin and 4.0 g. of silver chloride and applied to a waterproof paper to yield a coating having 100 ml. of the resulting emulsion per m.$^2$. To 100 g. of the foregoing emulsion were added 4.5 ml. of 1 N caustic soda solution and 2 ml. of 1% hydrazine hydrochloride aqueous solution, heated at 40° C. for 40 minutes to fog the silver chloride, to which 4.3 ml. of 1 N sulfuric acid solution and 4 ml. of 6% formaldehyde aqueous solution were then added, and the resulting emulsion was applied to the first coating to yield a coating having 50 ml. of the resulting emulsion per m.$^2$ as a second layer, followed by drying, to prepare a printing element.

After exposure, the printing element was processed in the activating solution of Example 2 at 30° C. for 5 minutes and then immersed in the stopping solution of Example 1 for 20 seconds to obtain a lithographic printing plate.

Development in this example was carried out at a pH of 12.98.

EXAMPLE 5

(Cf. FIG. 5, positive-positive process)

To a waterproof paper was applied a mixture of 100 ml. of 10% gelatin aqueous solution, 2 ml. of 1 N sulfuric acid solution, 10 ml. of 6% saponin aqueous solution, 20 ml. of 10% 4-methoxy-1-naphtholmethanol solution and 8 ml. of 6% formaldehyde aqueous solution to yield a coating having 120 ml. of the resulting solution per m$^2$. Two ml. of 6% formaldehyde aqueous solution was added to 100 g. of a photographic emulsion containing 8.3 g. of gelatin and 21.2 g. of silver chloride and applied to the first coating as a second layer to yield a coating having 37 ml. of the resulting emulsion per m.$^2$. Then 5.2 ml. of 1 N caustic soda solution and 2 ml. of 1% hydrazine hydrochloride aqueous solution were added to 100 g. of a photographic emulsion containing 15.0 g. of gelatin and 4.0 g. of silver chloride, heated at 40° C. for 40 minutes to fog the silver chloride, to which 5.0 ml. of 1 N sulfuric acid solution, 50 ml. of water, 10 ml. of 6% saponin aqueous solution and 4 ml. of 6% formaldehyde aqueous solution were then added, and the resulting emulsion was applied to the second layer to yield a coating having 63 ml. of the resulting emulsion per m.$^2$ as a third layer, followed by drying, to prepare a printing element.

After exposure, the element was developed in an activating solution of the following composition at 30° C. for five minutes:

| | G. |
|---|---|
| Tribasic potassium phosphate | 200 |
| Potassium hydroxide | 5.6 |
| Water to 1,000 ml. | |

After the development, it was immersed in the stopping solution of Example 1 for 20 seconds to obtain a lithographic printing plate.

Development in this example was carried out at pH of 12.80.

EXAMPLE 6

(Cf. FIG. 6, positive-positive process)

Four ml. of 6% formaldehyde aqueous solution was added to 100 g. of a photographic emulsion containing 8.3 g. of gelatin and 27.6 g. of silver bromide, applied to a film to yield a coating having 15 ml. of the resulting emulsion per m.$^2$ and dried to prepare a printing element.

After exposure, the element was developed in a first developing solution of the following composition at 20° C. for 3 minutes:

| | G. |
|---|---|
| p-Methylaminophenol | 1 |
| Anhydrous sodium sulfite | 2 |
| Caustic soda | 0.16 |
| Water to 1,000 ml. | |

After the first development, it was washed with water for 30–60 seconds and developed in a second developing solution of the following composition at 30° C. for 3 minutes:

| | |
|---|---|
| Anhydrous sodium sulfite ____g__ | 5 |
| 6-ethoxythioindoxyl ____g__ | 19.4 |
| Caustic soda ____g__ | 60 |
| Ethylenediamine ____ml__ | 15 |
| Water to 1,000 ml. | |

After the second development, it was immersed in the stopping solution of Example 1 for 20 seconds to obtain a lithographic printing plate. If the water washing after the first development and the stopping after the second development are omitted, the lithographic printing element can be obtained although the quality of print lowers somewhat.

Development in this example was carried out at a pH of 13.78.

EXAMPLE 7

(Cf. FIG. 7, positive-positive process)

To 100 g. of a photographic emulsion containing 5.4 g. of gelatin and 7.8 g. of silver chlorobromide (silver bromide 30 mole percent) were added 1.8 g. of 1-phenyl-3-pyrazolidone, 0.5 ml. of 1% sodium 13-(p-nonyl-phenoxy)-5,8,11-trioxadecane-1-sulfonate aqueous solution, 0.8 ml. of 6% by weight saponin aqueous solution and 5 ml. of 6% by weight formaldehyde aqueous solution, applied to a film to yield a coating having 83 ml. of the resulting emulsion per m.$^2$ and dried to provide a printing plate element.

After exposure, the element was developed in an activating solution of the following composition at 20° C. for 3 minutes:

| | G. |
|---|---|
| Caustic soda | 3.4 |
| Water to 1,000 ml. | |

After the first development, it was washed with water and then processed in a second developing solution of the following composition at 30° C. for 3 minutes:

| | |
|---|---|
| Anhydrous sodium sulfite ____g__ | 5 |
| 4-amino-N-ethyl-N-(β-hydroxyethyl)-aniline ____g__ | 9 |
| Caustic soda ____g__ | 3.4 |
| Ethylenediamine ____ml__ | 5 |
| Hydroxylamine ____g__ | 3 |
| Benzyl alcohol ____g__ | 0.75 |
| Water to 1,000 ml. | |

After the second development, it was immersed in the stopping solution of Example 1 for 20 seconds to obtain a lithographic printing plate.

Even if the water washing after the first development and the stopping after the second development are omitted, the lithographic printing plate can be obtained although the quality of print lowers somewhat.

Development in this example was carried out at a pH of 12.62.

EXAMPLE 8

(Cf. FIG. 5, positive-positive process)

To a waterproof paper was applied a mixture of 100 ml. of 10% gelatin aqueous solution, 2 ml. of 1 N sulfuric acid solution, 1 g. of hydroquinone and 5 ml. of 6% formaldehyde aqueous solution to yield a coating having 47 ml. of the resulting solution on per m.$^2$. 5.2 ml. of 2% mucochloric acid aqueous solution and 0.9 ml. of anhydrous sodium carbonate aqueous solution were added to 100 g. of a photographic emulsion containing 8.0 g. of gelatin and 12.2 g. of silver chlorobromide (silver bromide 30 mole percent) and applied as a second layer to the first layer to yield a coating having 82 ml. of the resulting emulsion per m$^2$. Furthermore, 4.6 ml. of 1 N caustic soda solution and 1.8 ml. of 1% by weight hydrazine hydrochloride aqueous solution were added to 34 g. of a photographic emulsion containing 5.4 g. of gelatin and 7.8 g. of silver chlorobromide (silver bromide 30 mole percent), heated at 40° C. for 40 minutes to fog the silver chlorobromide, to which 4.5 ml. of 1 N sulfuric acid, 200 ml. of water and 6 ml. of 6% formaldehyde aqueous sloution were then added, and the resulting emulsion was applied as a third layer to the second layer to yield a coating having 68 ml. of the resulting emulsion per m$^2$, followed by drying, thereby to prepare a printing element.

After exposure, the element was processed in 1 N caustic soda solution at 30° C. for 20 seconds and then immersed in the stopping solution of Example 1 for 20 seconds to obtain a lithographic printing plate.

Development in this example was carried out at a pH of 13.58.

As earlier discussed, the Yackel et al. patent discloses that certain aromatic silver halide developing agents fail to form oleophilic images, and this is due to the fact that Yackel et al. fail to operate at a pH alkaline enough to permit oleophilic dimer formation. Accordingly, as a comparison of the prior art to the process of the present invention, the following comparative example is offered:

Comparative example

The same procedure as carried out in Example 8 was employed, except for the following types of alkaline solutions and densities thereof as indicated in the table illustrated below.

| Type of alkali | Density of alkali | pH (20° C.) | Use as lithographic plate |
|---|---|---|---|
| NaOH | 1 N | 13.53 | Possible. |
| NaOH | 0.1 N | 13.00 | Do. |
| NaOH | 0.05 N | 12.64 | Do. |
| NaOH | 0.025 N | 12.3 | Impossible. |
| NaOH | 0.01 N | 12.04 | Do. |
| Trisodium phosphate | 8% | 12.26 | Do. |
| $Na_2CO_3 \cdot H_2O$ | 4% | 11.58 | Do. |

As is indicated in the table above, when development with an aromatic silver halide developing agent is carried out at a pH below 12.5, the formation of the oleophilic dimer is impossible and yet when the pH is 12.5 or higher, oleophilic dimer formation is readily possible.

Although the present application has been adequately discussed and illustrated in the foregoing specification and examples included therein, it is readily apparent that various changes and modifications can be made without departing from the scope thereof.

What is claimed is:

1. A process for preparing a lithographic printing plate, which comprises (a) exposing to a subject a photographic element comprising a support having thereon a silver halide emulsion layer and (b) developing, at a pH of at least 12.5 with a conventional aromatic silver halide developing agent which forms an oleophilic dimer from its oxidation product to produce on said hydrophilic emulsion layer an oleophilic dimer image receptive of greasy printing ink, wherein said developing agent is incorporated in at least one of the layers of said photographic element and processing solution.

2. A process for preparing a lithographic printing plate, which comprises (a) exposing to a subject a photographic element comprising a support having thereon a silver halide emulsion layer whose surface is hydrophilic, (b) developing, at a pH of at least 12.5 said exposed emulsion layer with an aqueous alkaline solution of a conventional aromatic silver halide developing agent which forms an oleophilic dimer from its oxidation product to produce on said hydrophilic emulsion layer an oleophilic dimer image receptive of greasy printing ink, and then (c) carrying out stopping thereof.

3. A process for preparing a lithographic printing plate, which comprises (a) exposing to a subject a photographic element comprising a support having thereon a silver halide emulsion layer containing a conventional aromatic silver halide developing agent which forms an oleophilic dimer from its oxidation product, (b) developing, at a pH of at least 12.5 said exposed emulsion layer with an aqueous alkaline solution to produce on said hydrophilic emulsion layer an oleophilic dimer image receptive of greasy printing ink, and then (c) carrying out stopping thereof.

4. A process for preparing a lithographic printing plate, which comprises (a) exposing to a subject a photographic element comprising a support having thereon a layer containing a conventional aromatic silver halide developing agent which forms an oleophilic dimer from its oxidation product and over said layer a silver halide emulsion layer whose surface is hydrophilic, (b) developing, at a pH of at least 12.5 said exposed emulsion layer with an aqueous alkaline solution to produce on said hydrophilic emulsion layer an oleophilic dimer image receptive of greasy printing ink, and then (c) carrying out stopping thereof.

5. A process for preparing a lithographic printing plate, which comprises (a) exposing to a subject a photographic element comprising a support having thereon an unfogged silver halide emulsion layer containing a conventional aromatic silver halide developing agent which forms an oleophilic dimer from its oxidation product and over said layer a fogged silver halide emulsion layer whose surface is hydrophilic, (b) developing, at a pH of at least 12.5 said exposed emulsion layer with an aqueous alkaline solution to produce on said hydrophilic emulsion layer an oleophilic dimer image receptive of greasy printing ink, and then (c) carrying out stopping thereof.

6. A process for preparing a lithographic printing plate, which comprises (a) exposing to a subject a photographic element comprising a support having thereon a layer containing a conventional aromatic silver halide developing agent which forms an oleophilic dimer from its oxidation product, over said layer an unfogged silver halide emulsion layer and over said emulsion layer a fogged silver halide emulsion layer whose surface is hydrophilic, (b) developing, at a pH of at least 12.5 said exposed emulsion layer with an aqueous alkaline solution to produce on said hydrophilic emulsion layer an oleophilic dimer image receptive of greasy printing ink, and then (c) carrying out stopping thereof.

7. A process for preparing a lithographic printing plate, which comprises (a) exposing to a subject a photographic element comprising a support having thereon a silver halide emulsion layer whose surface is hydrophilic, (b) developing said exposed emulsion layer with a nontanning developing solution, (c) washing with water, (d) developing, at a pH of at least 12.5 said treated emulsion layer with an aqueous alkaline solution containing a fogging agent of silver halide and a conventional aromatic silver halide developing agent which forms an oleophilic dimer from its oxidation product to produce on said hydrophilic emulsion layer an oleophilic dimer receptive of greasy printing ink, and then (e) carrying out stopping thereof.

8. A process for preparing a lithographic printing plate, which comprises (a) exposing to a subject a photographic element comprising a support having thereon a hydrophilic silver halide emulsion layer containing a nontanning developing agent, (b) developing, at a pH of at least 12.5 said exposed emulsion layer with an aqueous alkaline solution, (c) washing with water, (d) developing said treated emulsion layer with an aqueous alkaline solution containing a fogging agent of silver halide and a conventional aromatic silver halide developing agent which forms an oleophilic dimer from its oxidation product to produce on said hydrophilic emulsion layer an oleophilic dimer image receptive of greasy printing ink, and then (e) carrying out stopping thereof.

9. The process as claimed in claim 7 wherein said nontanning developing agent is p-aminophenol or 1-phenyl-3-pyrazolidone.

10. The process as claimed in claim 1 wherein said compound is selected from the group consisting of thioindoxyl, 6-methoxythioindoxyl, 6-ethoxythioindoxyl, indoxyl, 4-hydroxyisocarbostyril, 4-methoxy-1-naphthol, 4-ethoxy-1-naphthol, pyrogallol-1,3-dimethylether, o-aminophenol, 2-amino-3,5-dimethylphenol, 1-phenyl-3-methyl-4-amino-5-pyrazolone, 1,5-dihydroxynaphthalene, 4-(N,N-diethylamino)aniline, 2-methyl-4-(N,N-diethylamino) aniline, 4-(N-ethyl-N-hydroxyethylamino)aniline, 2-methyl-4-(N-ethyl-N-hydroxyethylamino)aniline, 2 - methyl-4-(N-ethyl-N-methylsulfonyliminoethyl)aniline and hydroquinone.

11. The process as claimed in claim 8 wherein said nontanning developing agent is p-aminophenol or 1-phenyl-3-pyrazolidone.

12. The process as claimed in claim 7 wherein said compound is selected from the group consisting of thioindoxyl, 6-methoxythioindoxyl, 6-ethoxythioindoxyl, indoxyl, 4-hydroxyisocarbostyril, 4-methoxy-1-naphthol, 4-ethoxy-1-naphthol, pyrogallol-1,3-dimethylether, o-aminophenol, 2-amino-3,5-dimethylphenol, 1-phenyl-3-methyl-4-amino-5-pyrazolone, 1,5-dihydroxynaphthalene, 4-(N,N-diethylamino)aniline, 2-methyl-4-(N,N-diethylamino) aniline, 4-(N-ethyl-N-hydroxyethylamino)aniline, 2-methyl-4-(N-ethyl-N-hydroxyethylamino)aniline, 2-methyl-4-(N-ethyl-N-methylsulfonyliminoethyl)aniline and hydroquinone.

13. The process as claimed in claim 8 wherein said compound is selected from the group consisting of thioindoxyl, 6-methoxythioindoxyl, 6-ethoxythioindoxyl, indoxyl, 4-hydroxyisocarbostyril, 4-methoxy-1-naphthol, 4-ethoxy-1-naphthol, pyrogallol-1,3-dimethylether, o-aminophenol, 2-amino-3,5-dimethylphenol, 1-phenyl-3-methyl-4-amino-5-pyrazolone, 1,5-dihydroxynaphthalene, 4-(N,N-diethylamino)aniline, 2-methyl-4-(N,N-diethylamino) aniline, 4-(N-ethyl-N-hydroxyethylamino)aniline, 2-methyl-4-(N-ethyl-N-hydroxyethylamino)aniline, 2-methyl-4-

(N-methyl - N - methylsulfonyliminoethyl) aniline and hydroquinone.

References Cited

UNITED STATES PATENTS

| | | | |
|---|---|---|---|
| Re 25,885 | 10/1965 | Yackel et al. | 96—33 |
| 3,062,648 | 11/1962 | Crawford | 96—33 X |
| 2,716,059 | 8/1955 | Yutzy et al. | 96—28 |
| 2,533,463 | 12/1950 | Ives | 96—33 |
| 2,563,785 | 8/1951 | Ives | 96—33 |
| 3,326,685 | 6/1967 | Abbott et al. | 96—33 |

J. TRAVIS BROWN, Primary Examiner

W. H. LOUIE, JR., Assistant Examiner

U.S. Cl. X.R.

96—64, 59, 55, 66 R, 62, 68, 76